United States Patent [19]

Simon

[11] Patent Number: 5,320,580
[45] Date of Patent: Jun. 14, 1994

[54] LIGHTWEIGHT DRIVE SHAFT

[76] Inventor: Joseph A. Simon, 237 Lothrup, Grosse Pointe Farms, Mich. 48236

[21] Appl. No.: 13,155

[22] Filed: Feb. 1, 1993

Related U.S. Application Data

[60] Continuation of Ser. No. 826,801, Jan. 28, 1992, abandoned, which is a division of Ser. No. 550,303, Jul. 9, 1990, Pat. No. 5,105,644.

[51] Int. Cl.$^5$ .............................................. F16C 3/00
[52] U.S. Cl. .................................................. 464/183
[58] Field of Search ........................ 464/183, 180, 179

[56] References Cited

U.S. PATENT DOCUMENTS

| | | | |
|---|---|---|---|
| 733,222 | 7/1903 | Leibert et al. | 464/183 X |
| 1,490,219 | 4/1924 | Laberton et al. | 464/183 X |
| 2,258,066 | 10/1941 | Oyen | 464/183 X |
| 2,380,952 | 8/1945 | Dewey | 464/183 X |
| 2,738,660 | 3/1956 | Gail | 464/180 |
| 3,146,611 | 9/1964 | Fox | 464/183 |
| 3,152,458 | 10/1964 | Simonin | 464/183 |
| 3,837,205 | 9/1974 | Simon | 74/607 X |
| 3,886,649 | 6/1975 | Simon | 74/607 X |
| 4,036,030 | 7/1977 | Papst | 464/180 X |
| 4,127,080 | 11/1978 | Lakiza et al. | 464/183 X |
| 4,214,457 | 7/1980 | Wade et al. | 464/183 X |
| 4,277,969 | 7/1981 | Simon | 74/607 X |
| 4,292,831 | 10/1981 | Simon | 74/607 X |
| 4,392,839 | 7/1983 | Aucktor | 464/183 |
| 4,421,497 | 12/1983 | Federmann et al. | 464/183 X |
| 4,747,796 | 5/1988 | Iwai et al. | 464/180 X |
| 4,834,693 | 5/1989 | Profant et al. | 464/183 |
| 4,838,833 | 6/1989 | Coursin | 464/183 X |
| 4,932,924 | 6/1990 | Löbel | 464/183 X |

*Primary Examiner*—Joseph J. Hail, III
*Assistant Examiner*—Eileen A. Dunn
*Attorney, Agent, or Firm*—Harness, Dickey & Pierce

[57] ABSTRACT

A lightweight drive shaft, such as for use as an automotive vehicle engine drive shaft for transmitting engine power, has an elongated extruded tube of uniform external diameter. The tube is formed with a center section and integral opposite end sections which are extruded integrally so as to have similar metallurgical structures. The center section is longer than the end sections. The center section has a thin wall and the end sections each have thick walls of the same thickness, with the thin walls being roughly less than half or about one half the thickness of the thick walls. Also, a coupling formation is formed on the exterior of the thick wall in sections to connect the shaft to a power supply and power take off within a power transmission system.

3 Claims, 2 Drawing Sheets

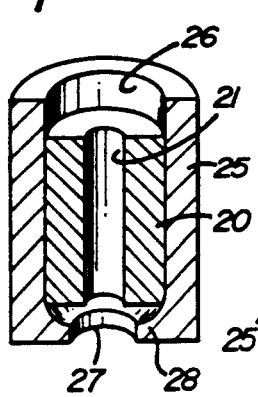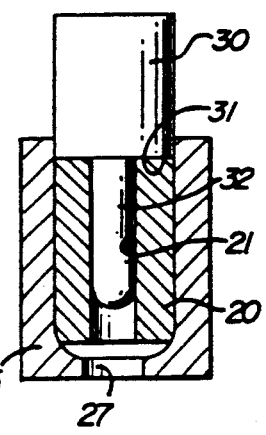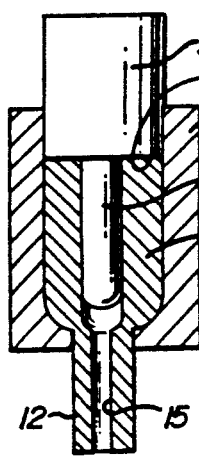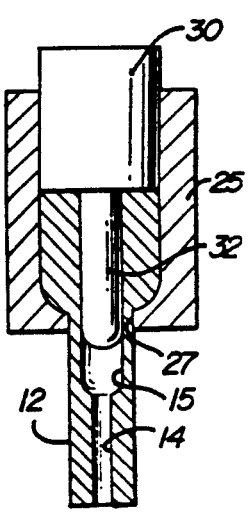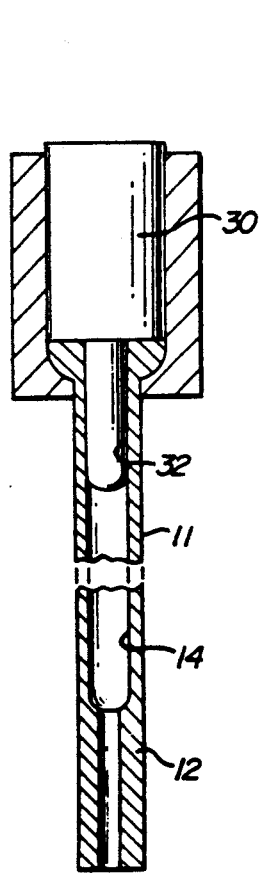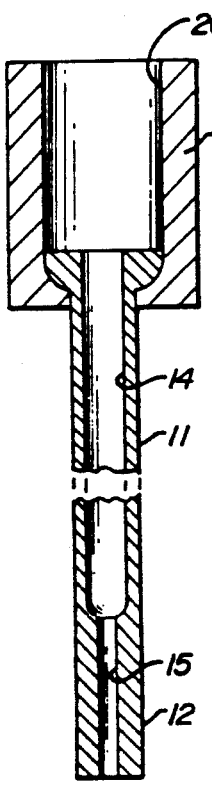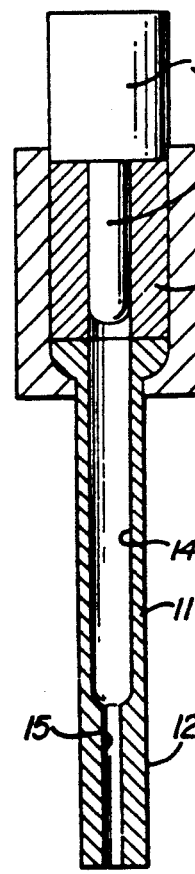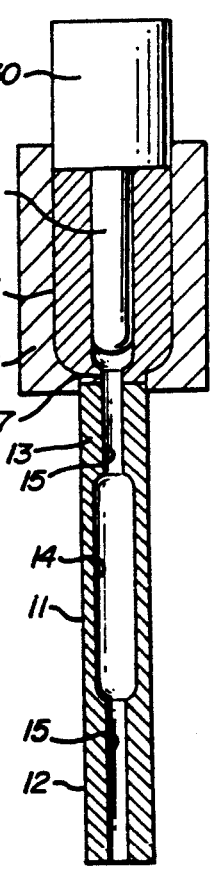

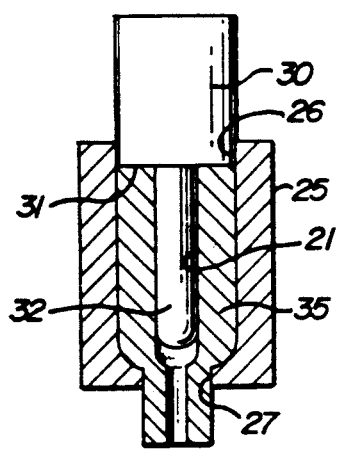
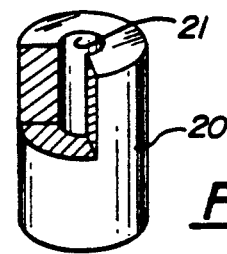
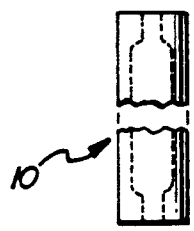
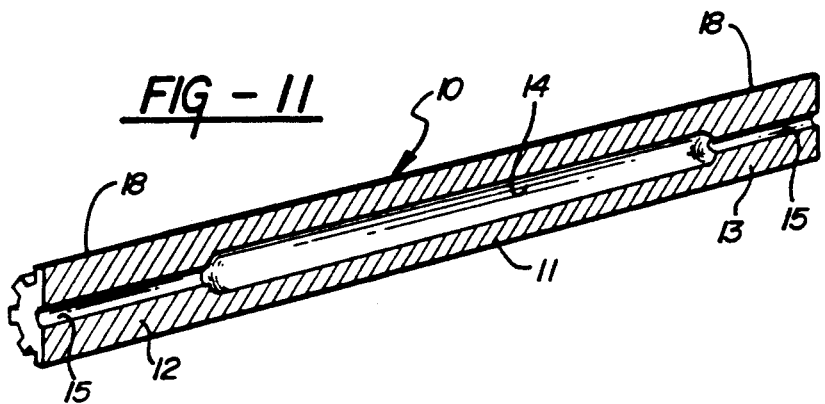
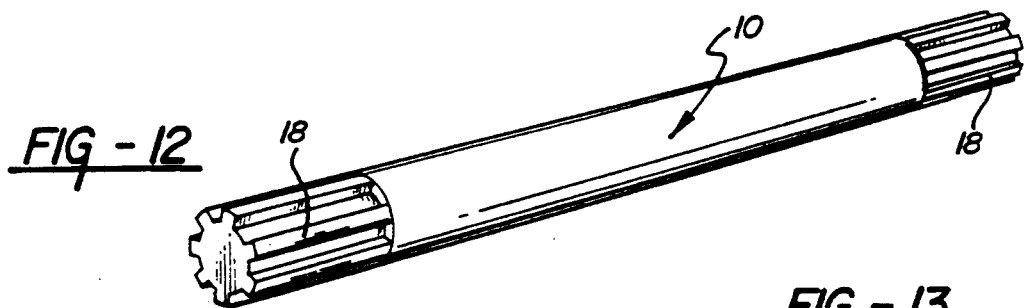
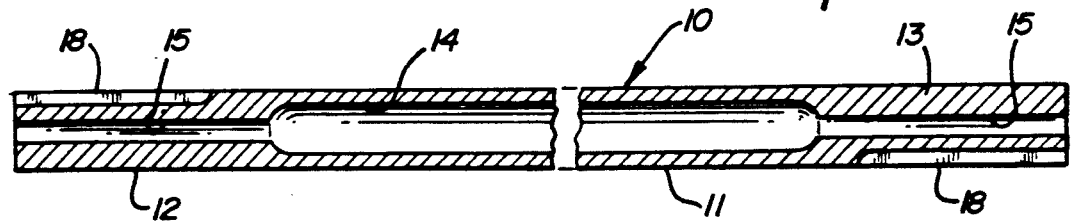
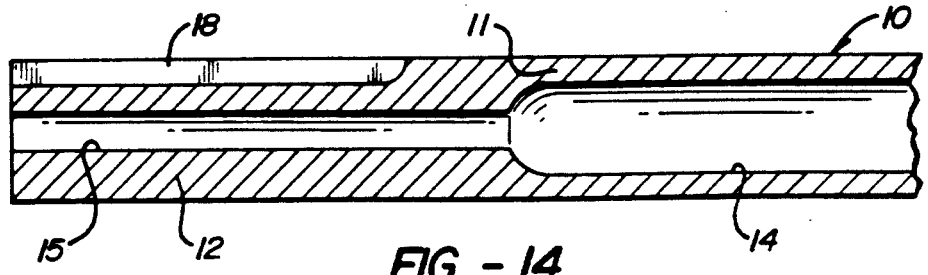

LIGHTWEIGHT DRIVE SHAFT

This is a continuation of U.S. patent application Ser. No. 826,801, filed Jan. 28, 1992 now abandoned which is a divisional of Ser. No. 550,303, filed Jul. 9, 1990 now U.S. Pat. No. 5,105,644.

BACKGROUND OF INVENTION

This invention relates to an improved drive shaft, such as is used in transmitting power from an automotive engine to the wheels, and more particularly, to a drive shaft of the same size and at least of the same strength as a conventional drive shaft, but of considerably lighter weight.

Drive shafts that are used in automotive vehicles for transmitting the engine rotary power to the wheels, typically, are formed of a solid, elongated, metal shaft having coupling formations formed on its opposite ends. These may comprise splines or other suitable couplings for connecting the ends of the shaft to the related engine and wheel connecting parts. Conventional drive shafts, that are used for front end drive vehicles, may be in the range of about 12 inches to about 36 inches, although the lengths vary considerably. These shafts are usually manufactured by forging and machining techniques and are relatively heavy. By way of example, an approximately 27 inch long shaft of about 1 inch diameter weighs about 5 pounds.

In recent times, in connection with fuel saving measures, vehicle manufacturers have endeavored to lighten the weight of various vehicle components. In the case of the power transmission shafts, reducing the weight is difficult because of the strength requirements and the manufacturing techniques used. Attempts have been made to drill through the center of such a shaft, so that the shaft is hollow, to reduce the weight, but this is relatively expensive and tends to weaken the shaft. Thus, there is a need to provide a manufacturing method to produce hollow, light weight drive shafts which maintain the strength requirements normally associated with solid shafts.

One manufacturing method for producing elongated tubes is cold forming extrusion. This manufacturing process is described in my U.S. Pat. No. 3,837,205 issued Sept. 24, 1974 for a "Process for Cold Forming a Metal Tube With Inwardly Thickened End", U.S. Pat. No. 3,886,649 issued Jun. 3, 1975 for a "Process for Cold Forming a Metal Tube With An Inwardly Thickened End", U.S. Pat. No. 4,277,969 issued Jul. 14, 1981 for a "Method for Cold Forming Tubes Within Interior Thicker Wall Sections" and U.S. Pat. No. 4,292,831 issued Oct. 6, 1981 for a "Process for Extruding Metal Tube with Inwardly Thickened End Portions". In addition, a similar process is disclosed in my copending application, U.S. patent application Ser. No. 07/490,286, filed Mar. 8, 1990, now U.S. Pat. No. 4,991,451 and relating to a Steering Gear Rack Type Device. The invention herein is concerned with adapting the cold forming extrusion process for manufacturing tubular drive shafts having central sections formed with thinner walls than the end sections for reducing the weight of the article while maintaining its required performance strength and structural characteristics.

SUMMARY OF INVENTION

This invention contemplates extruding an integral elongated tubular drive shaft having a central and two opposite end sections, with the central section having a considerably thinner wall than the opposite end sections. The added thickness of the end sections provide the rigidity needed and also, the ability to form coupling configurations, such as splines and the like at the ends of the drive shaft. The thinner central section, provides sufficient strength, but also some resiliency, for transmitting power and absorbing rapid changes in the amount of power transmitted at any particular moment, as well as to resiliently yield and absorb other shock and vibratory forces.

The invention contemplates manufacturing the drive shaft by first, forming a tubular blank having an interior opening which is close to the interior diameter of the thin wall section of the drive tube. The blank is positioned within a tubular die having a constricted extrusion throat through which the blank is extruded.

A power driven punch is inserted within the die. The punch has a longitudinally extending extension which closely fits within the opening in the blank, but does not extend the full length of the blank. That is, it terminates at a predetermined distance from the die throat. The punch pushes the blank toward the die throat so that, first, the leading end of the blank is extruded through the die throat to reduce its outer diameter and, simultaneously, to collapse the material inwardly. This forms an inner, tubular opening with a thick wall end section on the tube. By coordinating the length of the extension and the dimensions of the blank, a preselected length of thick wall tubing portion is formed.

Subsequently, as the punch moves towards the die throat, its extension moves into the die throat and remains within the die throat as the punch advances. During that time, further extrusion of the blank results in the blank exterior diameter being extruded to the required exterior diameter of the shaft. But the interior diameter of the tube remains essentially the same as the diameter of the blank and punch extension. This forms the long length, thin wall center section of the drive.

Close to the end of the extrusion of the blank, the punch is stopped and is completely removed. A new blank is placed within the die and then the punch is reinstalled with its extension located within the new blank. Then, movement of the punch towards the throat presses the new blank against the trailing end portion of the first blank. The pressure causes the completion of the extrusion of that trailing end portion, while causing the leading end portion of the second blank to extrude. This forms a thick wall end section on the trailing end of the first blank and on the lead end of the second blank.

When the first blank is completely extruded, it is removed and the process is completed to continuously produce the tubes, blank by blank.

One object of this invention is to provide a simplified procedure, utilizing a single punch, to extrude an elongated tube. The tube can be of considerable length, with elongated thick wall end sections and a thin, lengthy center section. The sections will be metallurgically similar due to the extrusion. Therefore, the ends of the finished, extruded drive shaft may be heat treated or the entire shaft may be heat treated, as required. For example, the opposite ends may be heat treated to improve hardness and wear resistance, etc.

Another object of this invention is to provide an inexpensive, simplified procedure, for producing a high strength drive shaft which is hollow so as to be considerably lighter than the equivalent drive shafts conventionally used. For example, as mentioned a 27 inch long, 1 inch diameter solid drive shaft may weigh about 5 pounds, whereas the improved drive shaft of this invention may weigh only about 3 pounds. Saving 2 pounds on the product is a considerable weight reduction in the automotive industry.

These and other objects and advantages of this invention will become apparent upon reading the following description of which the attached drawings form a part.

DESCRIPTION OF DRAWINGS

FIG. 1 is a cross sectional, schematic view of the extrusion blank positioned within a die.

FIG. 2 is a cross sectional, schematic view showing the punch located within the die and blank.

FIG. 3 is a schematic, cross sectional view showing the extrusion of the lead portion thick wall section.

FIG. 4 is a schematic, cross sectional view showing the beginning of the extrusion of the thin wall center section.

FIG. 5 is a schematic, cross sectional view showing the completion of the extrusion of the thin wall, center section.

FIG. 6 schematically illustrates the removal of the punch following the extrusion of the center section.

FIG. 7 schematically illustrates the positioning of the second blank within the die and the positioning of the punch within the die and second blank.

FIG. 8 schematically illustrates the completion of the extrusion of the trailing end, thick wall section of the first blank and the extrusion of the leading end portion of the second blank.

FIG. 9 schematically, and partially in cross section, illustrates the removal of the extruded first blank and the continuation of the extrusion of the second blank.

FIG. 10 is a perspective, partially cross sectional view of a blank.

FIG. 11 is a perspective, partially cross sectional view of an extruded drive shaft after the formation of splines on the opposite, thick wall end sections.

FIG. 12 is a perspective view of a completed, splined, drive shaft.

FIG. 13 is a cross sectional view of the drive shaft with the splines formed on the opposite ends, and FIG. 14 is an enlarged, cross sectional view showing the end portion and part of the center portion of a drive shaft.

DETAILED DESCRIPTION

FIGS. 11-13 illustrate a light weight drive shaft 10 which is formed with a thin wall, center section 11 and opposite, integral, thick wall end sections 12 and 13. The extrusion process forms a relatively large diameter, central opening 14 and smaller diameter openings 15 in the opposite end sections 12 and 13. For example, the end openings 15 may be about one half the diameter of the central opening 14.

After the shaft is extruded, its opposite, thick wall ends, are formed with coupling configurations or formations. By way of example, the drawings show spline teeth 18 formed on the opposite ends. However, the ends could be threaded or provided with other configurations for coupling the opposite ends of the drive shaft to the machine elements to which they are to be connected.

The process for manufacturing the drive shaft starts with a tubular blank 20 (see FIG. 10) which has a central opening or hole 21. The diameter of that hole is about equal to the intended diameter of the interior of the thin wall center section 11.

The blank is dropped into a tubular die 25 through an open entry end 26 in the die. The opposite end of the die is provided with a constricted extrusion throat 27 provided by an annular, inwardly extending shoulder 28.

After the blank is dropped into the die, a punch 30 is positioned in the die. The punch has a lead end which is formed as an annular, blunt surface 31 which overlaps and abuts the trailing end of the blank. In addition, the punch has a punch extension 32 which is of a diameter that approximates the diameter of the hole 21 in the blank. Thus, the extension closely fits within the blank hole.

The punch extension is of a length that is slightly less than the height of the blank, as illustrated in FIG. 2. Thus, its free end is spaced longitudinally away from the die throat a short distance.

FIG. 2 illustrates the blank positioned within the die and the punch, with its punch extension 32, positioned relative to the blank 30. Then, the punch is moved towards the die throat, as illustrated in FIG. 3. This causes the leading end of the blank to extrude through the die throat. As the end portion extrudes, it collapses radially inwardly, leaving the central, smaller diameter opening 15. During this time, the punch extension is located above, that is, spaced from, the die throat.

As the punch continues movement towards the die throat, it extension 32 enters the die throat. There, the punch extension acts like a mandrel and the continued extrusion forms the thin wall, center section of the shaft. As the die continues its movement, the punch moves through the die throat, remaining within the die throat as a mandrel, as shown in FIG. 5. At that point, the extrusion of the thin wall, center section is complete.

Next, the punch is removed from the die, as shown in FIG. 6, leaving the trailing end portion of the blank unextruded. Next, a second blank 35, identical to the first blank, is dropped into the die through its entry end. The same punch is replaced in position within the die. Now, the punch abuts the second blank and its extension extends into the opening in the second blank. Again, the punch is moved toward the die throat so that the second blank acts as the punch did in pushing the first blank through the die throat for extruding it.

As shown in FIG. 8, the continued movement of the punch, with the punch extension spaced longitudinally away from the die throat, causes the trailing end portion of the first blank to extrude and, simultaneously, collapse inwardly to form the thick wall end section 13. Meanwhile, the lead end portion of the second blank is extruded through the die throat and, likewise, collapses inwardly to form the thick wall end extension 12.

Next, as illustrated in FIG. 9, the lead end of the second blank continues extruding through the die throat, pushing the first blank out of the die throat so that the extruded first blank may be removed for forming the connection configurations on its ends.

The size of the drive shaft may vary considerably, depending upon the particular intended use. By way of example, a drive shaft of about 27 inches in length, 1 inch in diameter, with a larger opening of ⅝ of an inch and a smaller opening of ¼ inch, a thin wall thickness of 3/16 of an inch and a thick wall thickness of ⅜ of an inch, and end sections which are 3½ inches long, when made of steel, weighs about 3 pounds. This contrasts with the 5 pound weight of a drive shaft of the same size, but of solid construction, The hollow drive shaft, because of the extrusion of the metal is strong enough to meet the requirements. Typically, such drive shafts may have their opposite ends heat treated or otherwise metallurgically improved, such as by nitriding, for increasing the strength, toughness or wear resistance, depending upon the requirements of the particular use.

The sizes of the shafts typically may range from 12 inch length to 36 inch lengths, with the diameter ranging between roughly 1 to 2 inches, and the lengths of the end sections ranging from 3½ to 6½ inches. Similarly, the wall thicknesses may vary from ⅛ inch to ¼ inch for the thin wall section with the thick wall being roughly twice that thickness.

The foregoing description discloses an operative embodiment of this invention. Accordingly, it is desired that the description be read as being merely illustrative of an operative embodiment and not in strictly limited sense.

Having fully described such an operative embodiment, I now claim:

1. A light weight drive shaft for transmitting engine power in automotive vehicles and like rotary power systems, comprising:

an elongated tube of a uniform external diameter;

the tube being formed with a center section and integral opposite end sections which are extruded integrally so as to comprise similar metallurgical structures;

said center section being longer than the end sections and said end sections being elongated with respect to their diameter;

said center section being formed with a thin wall and defining a first opening and the end sections each having thick walls of the same thickness, said thick walls defining a second opening, with the thin wall being about one half the thickness of the thick walls and the second opening being less than one half the size of the first opening;

and a coupling formation means formed on the exterior circumferential surface of the thick wall end sections for connecting the shaft to a power supply and power take off within a power transmission system.

2. A drive shaft as defined in claim 1, and including at least one of said coupling formation means being formed of splines for engaging a corresponding coupling device.

3. A drive shaft as defined in claim 2, and including said end sections each being of the same length.

* * * * *